United States Patent
Brenner

(10) Patent No.: US 6,375,227 B1
(45) Date of Patent: Apr. 23, 2002

(54) LATERAL DISPLACEMENT ASSIST COLLAR FOR HOSE COUPLER

(76) Inventor: Patrick J. Brenner, 26047 Kings Ct., Pioneer, CA (US) 95666

( * ) Notice: Subject to any disclaimer, the term of this patent is extended or adjusted under 35 U.S.C. 154(b) by 0 days.

(21) Appl. No.: 09/431,021

(22) Filed: Nov. 1, 1999

(51) Int. Cl.$^7$ ................................................ F16L 35/00
(52) U.S. Cl. ........................................ 285/38; 285/316
(58) Field of Search ............... 285/38, 316; 292/DIG. 2

(56) References Cited

U.S. PATENT DOCUMENTS

| | | | |
|---|---|---|---|
| 2,731,056 A | * 1/1956 | Anson | 292/DIG. 2 X |
| 3,023,030 A | * 2/1962 | Torres | |
| 3,052,488 A | * 9/1962 | Bruning | |
| 3,788,598 A | 1/1974 | German et al. | 251/149.6 |
| 4,004,476 A | 1/1977 | DeVrou | 81/177 |
| 4,007,909 A | * 2/1977 | Buseth et al. | 285/316 |
| 4,157,843 A | 6/1979 | Trnka | 285/113 |
| 4,541,314 A | 9/1985 | Korkowski | 81/58.1 |
| 4,596,272 A | 6/1986 | Medvick et al. | 137/614.03 |
| 5,058,928 A | * 10/1991 | Watson | 285/38 |
| 5,127,678 A | * 7/1992 | Henning | 285/38 |
| 5,224,740 A | * 7/1993 | Smith | 285/38 |
| 5,713,104 A | 2/1998 | Giampaolo, Jr. | 16/114 R |
| 5,857,241 A | 1/1999 | Camp, Jr. et al. | 16/111 R |
| 5,857,711 A | 1/1999 | Comin-DuMong et al. | 285/38 |
| 5,860,190 A | 1/1999 | Cano | 16/114 R |
| 5,876,134 A | 3/1999 | Tseng et al. | 401/6 |
| 5,884,943 A | * 3/1999 | Katzer et al. | |
| 5,893,297 A | 4/1999 | Rowe | 74/551.9 |
| 6,154,928 A | * 12/2000 | Thom | 292/DIG. 2 X |

* cited by examiner

Primary Examiner—Teri Pham Luu
(74) Attorney, Agent, or Firm—David Dolberg, Esq

(57) ABSTRACT

The present invention discloses a knob-like collar device adapted to fit securely around the lateral displacement locking sleeve of a quick-release hose coupler. The device promotes one-hand operation of the coupler by providing purchase and grip for the thumb of the hand holding the coupler thereby facilitating the lateral displacement of the locking sleeve. The device is particularly useful when the coupler is very cold, a condition that commonly results from the high velocity passage of fluids or gasses through the coupler. The device also absorbs mechanical shock resulting from the accidental dropping of the coupler on a hard surface, thereby protecting the coupler from damage.

14 Claims, 3 Drawing Sheets

LATERAL DISPLACEMENT ASSIST COLLAR FOR HOSE COUPLER

FIELD OF THE INVENTION

This invention relates generally to accessories for use in conjunction with quick-release hose couplings. More specifically, the invention relates to devices that improve grip and ergonomic function of annular, lateral displacement locking/unlocking collars used in conjunction with pneumatic and hydraulic hoses, including those commonly used in conjunction with pneumatic tools.

BACKGROUND OF THE INVENTION

Many types of rotating and reciprocating tools and machines are powered by air or other gasses flowing at high pressure. The high pressure air is delivered to the tool by means of a high pressure air line and the air line is coupled to the tools by means of a lockable, quick-release coupler. Typically, the coupler comprises a coupler nipple or stem, fixed on an end of a first air line and a coupler body, or coupling, fixed on an end of a second air line, The nipple and body are designed to cooperatively interact. The coupler body has an external annular collar or sleeve. The lateral movement of the sleeve along the long axis of the coupler body locks or unlocks the two hoses to each other and provides an airtight or watertight connection. The sleeve is laterally movable or slidable from a first locked position to a second unlocked position The sleeve is frequently biased toward the locked position by a coil spring so that the sleeve automatically closes. To couple the hoses, the nipple is inserted into the coupler body, displacing the sleeve from the first to second position thereby. Once the nipple is properly positioned within the coupler body, the sleeve returns from the second to first position, locking the two hoses and providing an air tight seal. To uncouple the hoses, the body is held in one hand, the sleeve is laterally displaced to the retracted, unlocked position with the second hand, and the hoses are separated. Many examples of such couplers are known in the art. See, e.g., U.S. Pat. No. 3,788,598. This type of coupler can also be adapted for use with high pressure fluid lines and are operated in a similar fashion. See, e.g., U.S. Pat. No. 4,596,272.

This type of coupler presents several operational problems. First, because the coupler diameter is relatively small, typically one-half to one and one-half inches, operators, particularly those with limited dexterity, have difficulty in sliding the coupling sleeve to the retracted position. Furthermore, the high velocity of gas or fluid moving through the coupler results in a sharp decrease in temperature—frequently below freezing. Since the coupler is typically metallic, the coupler itself becomes chilled, making manual operation of the coupler sleeve more difficult. Furthermore, pneumatic tools powered by the high pressure lines are frequently used outdoors, potentially in extremes of low temperature, exacerbating this problem. Similarly, users of such tool may have greasy or oily hands, making operation with two hands difficult and operation with one hand near impossible. Furthermore, in certain applications passage of hot gasses or fluids can cause the coupler to heat and this can make use of the coupler difficult and dangerous.

Another problem common to this type of coupler is that the coupler itself is sensitive to impact damage from being dropped repeatedly and care must be exercised to prevent dropping the coupler on a hard surface.

SUMMARY OF THE INVENTION

This invention describes a knob-like, lateral displacement assist collar device with a central open tube that is designed to fit around, and affix to the annular locking sleeve of a quick-release hose coupling. The device is designed to operate in combination with the locking sleeve and improve its operation. The device is contoured to ergonomically accommodate the hand grip of the operator, and facilitate one-handed operation of the locking sleeve by providing a secure purchase for the thumb of the hand that holds the coupler such that the sleeve can be laterally moved or retracted to release the coupled hoses. Typically, the collar is manufactured from rubber, silicone or similar soft plastic material that has impact shock absorbing characteristics and thereby provides protection against impact resulting from accidental dropping of the coupler, and thermal insulation to improve use under conditions in which the coupler is chilled or heated.

It is an object of this invention to provide a device that improves the one handed operation of the lateral displacement locking sleeve of a quick-release hose coupler.

It is a further object of this invention to provide a device that improves the one handed operation of the lateral displacement locking sleeve of a quick-release hose coupler when the coupler is above or below physiologic temperature.

It is a still further object of this invention to provide a device that absorbs the physical shock of impact resulting from accidental dropping of the coupler.

In accordance with the above objects and others, described herein, the lateral displacement assist collar device, for use in conjunction with quick-release hose couplers that have a laterally displaceable annular locking/unlocking sleeve, comprises a tube with an inner bore, an inner and outer side, and a first and second end with an interior region there between. This device is positionable and affixable upon the locking sleeve.

In an embodiment, the device is contoured such that the thickness from the inner to outer side of the tube is greater in the interior region than proximal to an end.

In another embodiment the device is permanently affixed to the annular locking sleeve.

In still another embodiment the device is removably affixed to the annular locking sleeve.

In yet another embodiment the device is composed of an elastic material that is radially stretchable such that the diameter of the inner bore is increased when the tube is radially stretched from a relaxed to a stretched position, said device being positionable around the annular locking sleeve when expanded to the radially stretched position, thereby gripably affixing to the sleeve after positioning.

DETAILED DESCRIPTION OF THE INVENTION

The Quick-Release Coupler—Introduction

Figure 3:
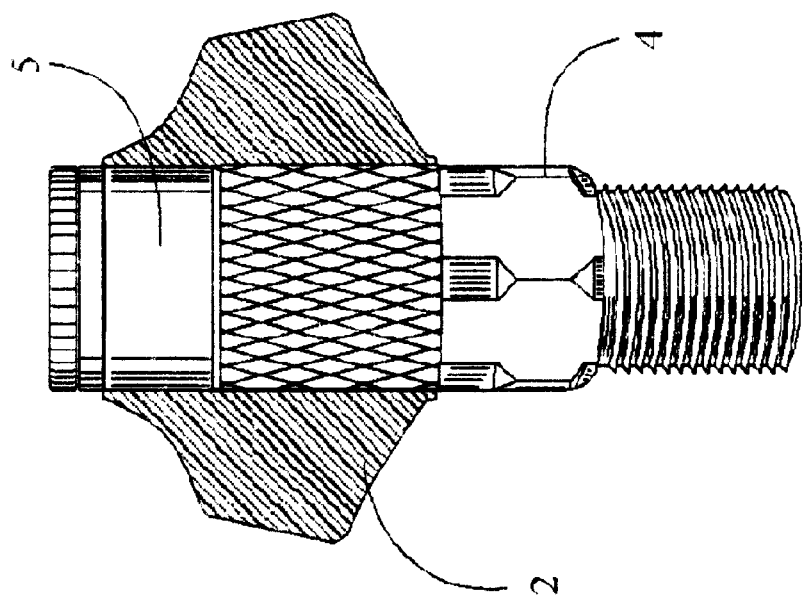
FIG. 3 is a cross-sectional elevation of the collar affixed to a quick-release hose coupler.

Pneumatic and hydraulic quick-release hose couplers are generally known and available. Hose couplers generally have two components—a coupler nipple which is attached to one hose end, and coupler body designed to receive the nipples which is attached to a second hose end. A generic quick-release coupler body is depicted in FIG. 3. Typically, the body (4) has an annular sleeve (5) that can be laterally diplaced by hand. This activates a locking/unlocking mechanism within the body and this holds the nipple in place within the body.

A. Pneumatic Couplers. Pneumatic applications, such as connecting air tools, hoses or other implements to compressed air supplies generally use single shutoff couplings. They can be used with other gasses and low pressure fluids. The coupler body (4) contains the shutoff valve that is automatically opened when a mating nipple is inserted into the central orifice of the body, and is automatically closed when the nipple is removed. The coupler body is designed with an annular sleeve (5) that can be moved laterally along the long axis of the coupler body. The sleeve is associated with the locking mechanism of the coupler such that the nipple is locked in place in the coupler body when the sleeve is at a first extreme of its movement along the coupler body and the nipple is unlock and removable from the coupler body when the sleeve is at the second extreme of its movement. The sleeve can be biased toward the locked position by a spring mechanism.

Coupler bodies (4) can be designed in two ways. In the first design, the coupler body can automatically receive and lock the mating nipple in place when the nipple is inserted into the coupler orifice. Release of the nipple from the coupler body requires retraction of the annular sleeve (5). In the second design, the sleeve (5) of the coupler body (4) must first be retracted in order to receive the nipple and then returned to the unretracted position to lock the nipple in place.

Pneumatic couplers are available in any size. Standard sizes accommodate hoses that range from ⅛ inch to ¾ inch diameters. The diameter of the sleeve of the coupler body generally ranges from ½ inch to 2 inches. Coupler bodies and nipples are designed to attach to hoses in several ways including male and female threading, and hose barbs.

B. Hydraulic Couplers. Hydraulic couplers generally fall into one of two groups, based on the valving of the coupler—double shutoff or straight through. Double shutoff couplings are useful when it is important to minimize fluid loss upon disconnection. Both the coupler body (4) and the nipple contain shutoff valves that open automatically when the body and nipple are connected, and close automatically when the two halves are separated. Straight through couplings have no valves in either half, thereby maximizing flow, minimizing pressure drops and facilitating cleaning. Fluid flow must be shut off at a distal location before connecting or disconnecting. As with pneumatic couplers, the coupler body (4) has an annular sleeve (5) that displaces laterally and serves to operate the locking mechanism that holds the nipple in place.

Generally available sizes accommodate hoses that range from ⅛ inch to 1 inch. The diameter of the sleeve of the coupler body ranges from ½ inch to 4½ inches. Both hydraulic and pneumatic couplers are commercially available from a variety of US manufacturers. Common brand names include PFC from Parker Hannifin Corp., Tru-Flate, Industrial, ARO, Lincoln, Schrader, C J, and D M.

The Lateral Displacement Assist Collar

This invention describes a knob-like tube or collar that assists in the lateral displacement of the locking sleeve of a quick-release hose coupler. The collar comprises a tube with a central internal channel or bore, designed to surround and closely fit around and adhere to the annular sleeve of the coupler body (FIG. 3). The exterior of the tube is contoured to easily fit in the hand of the user. Features are provided on or integral to the external surface of the collar, in the region between the two ends of the tube, providing purchase for the thumb of the hand holding the connector. These features allows the user to grip the coupler with one hand and more easily operate the annular sleeve of the coupler with the same hand.

Figure 1B:
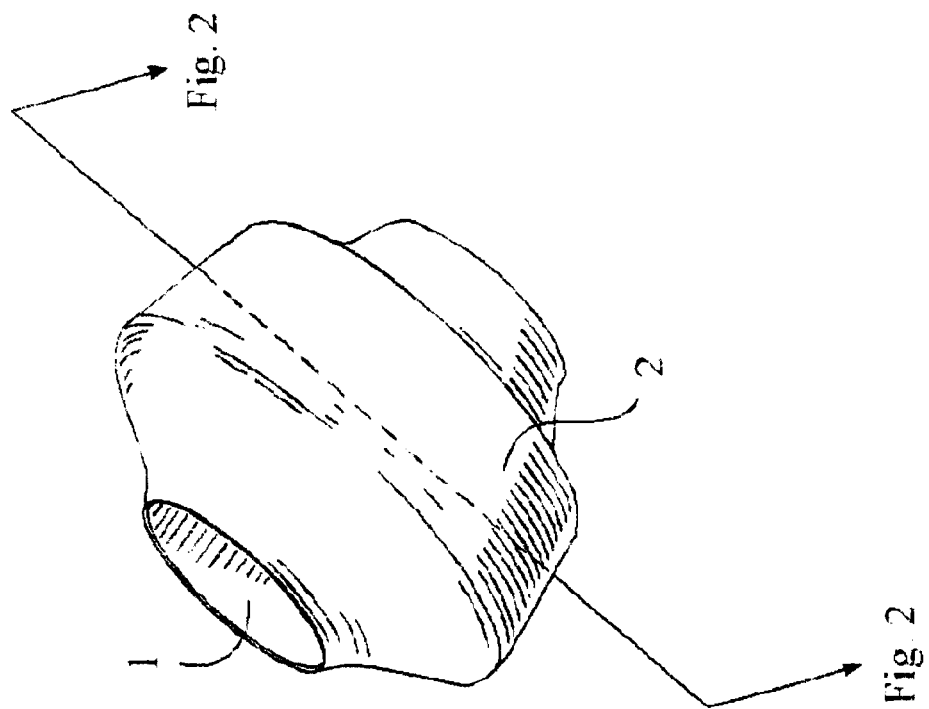
FIGS. 1-A&B are perspective views of the lateral assist collar.
Figure 1A:
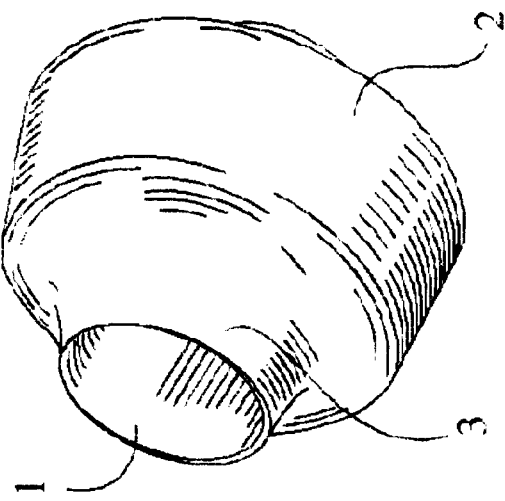
Figure 2:
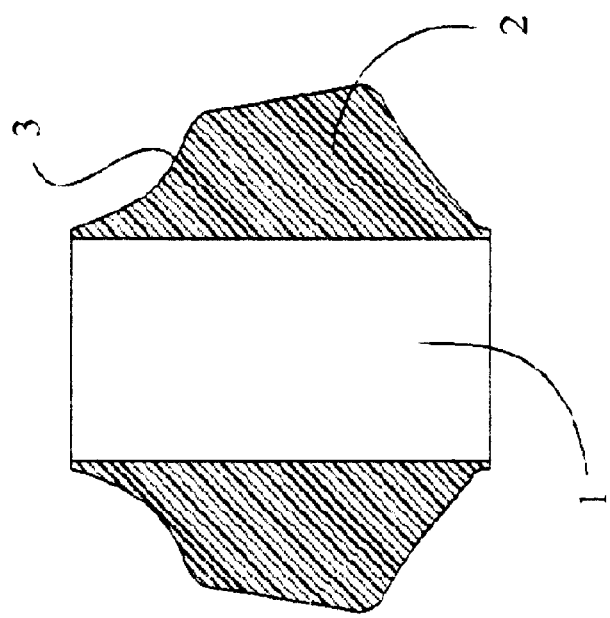
FIG. 2 is a cross-sectional elevation of the lateral assist collar.

FIGS. 1 & 2 depict a design embodiment of the collar. The bore (1) is designed to accommodate a particular size of coupler. The interior region (2) of the external side of the collar is thicker than at least one end (3) of the collar, providing a contoured ridge for purchase of the user's thumb.

The coupler is typically made of metal, usually brass or steel. Consequently, couplers are good conductors of heat and, are heated and cooled to extremes of temperature during, and as a result of, use. The collar of this invention can be fabricated from a variety of materials that provide excellent thermal insulation—e.g. silicone, rubber and plastics. This quality further facilitates the operation of the coupler sleeve by insulating the operator from the temperature extremes of the coupler itself These same materials also provide impact insulation for the coupler. Damage to quick-release couplers from the impact of being repeatedly dropped is one of the greatest contributors to the use durability of these couplers. Therefore, the instant invention extends the operational life of the coupler.

A. Design In an embodiment, the collar is designed to be placed on couplers as an after-market accessory. The collar is fabricated from an elastic material such as silicone, plastic or rubber. The collar is made in a variety of sizes such that the diameter of the central bore (1) is approximately the diameter of the sleeve upon which the collar will be used. The diameter of the central bore (1) is flexibly expanded as the collar is pushed upon sleeve and the collar is tightly positioned upon the sleeve such that the elasticity of the collar provides a frictional fit adequate to keep the collar registered to the sleeve during operation.

In a preferred embodiment, the collar is permanently affixed to the sleeve during manufacture of the coupler, using adhesives compatible with both the metal coupler and collar. Such adhesives are well known in the industry and readily available.

The overall size of the collar will vary depending on the size of the coupler for which the collar is designed. The largest diameter of the collar ranges from 1 inch to 5 inches. One inch collars are designed to be used with ⅛ inch couplers and 5 inch collar are designed to be used with 4.5 inch couplers. Typically, collar diameter will ranged from 1.5 to 2.5 inches.

The thickness of the collar itself ranges from 0.2 inches in the thin body (3) of the collar near an end, up to 1 inch in the meatiest part of the largest collars (2). The thickness of the interior region is proportional to the overall size of the collar.

Figure 4C:
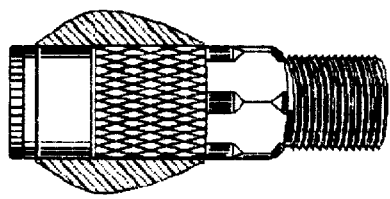
FIG. 4 depicts various contours of the interior region of the external side of the collar.
Figure 4F:
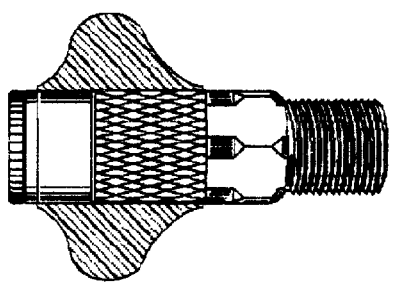
Figure 4B:
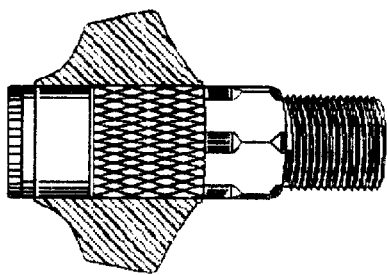
Figure 4E:
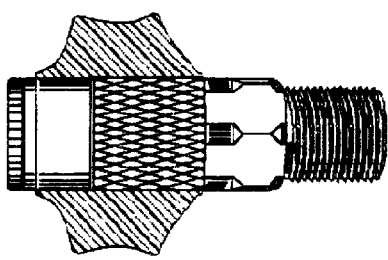
Figure 4A:
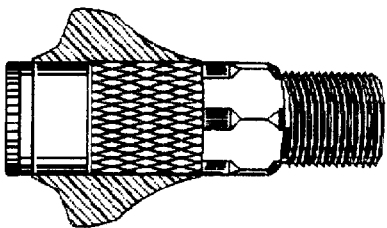
Figure 4D:
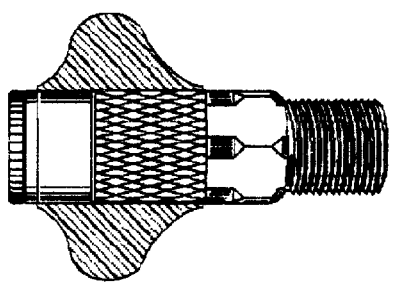

The external surface of the collar is designed to fit comfortably in the hand of the user. The region between the two ends of the bore, i.e. the internal region (2), is contoured to provide grip and purchase for the thumb of the hand holding the coupler. Several contour profiles provide adequate purchase. Some of the envisioned profiles are shown in FIG. 4. It is desirable to have a profile that is thicker in a portion of the internal region (2) than at at least one end (3) of the collar. The collar profile shown in FIG. 4D is the best mode. The profile in FIG. 4B is another preferred contour.

B. Fabrication

The collar can be fabricated from a variety of materials. In an embodiment, the collar is made from natural rubber. The bore is drilled to specification and the peripheral contour is turned on a lathe.

In another embodiment, the collar is fabricated from silicone, such as Dow Corning #795®. The material is applied to the collar, molded to the desired shape, and allowed to set at room temperature. In this embodiment, the collar is permanently affixed to the sleeve. In an alternative embodiment, the 795 material is molded around a form and removed from the form after curing. The form may be pretreated with a releasing agent.

In a preferred embodiment, the collar is fabricated in an injection molding system using a polymer resin, such as a plastic manufactured by General Electric. Cycolac® ABS resin is the resin of choice, however, other resins could be substituted. The process is well known in the industry.

EXAMPLES

Example 1

An after market lateral assist collar is fabricated to accommodate a pneumatic coupler with a ¼ inch body. The coupler is 1.95 inches overall length and the coupler sleeve is about 0.9 inches. The diameter of the coupler sleeve is 0.94 inches. The collar is fabricated from Cycolac® ABS resin by injection molding process. The overall length of the collar is 0.75 inches. The central bore is 0.8 inches, however, due to the elasticity of the material, the collar can be expanded to fit around the sleeve. Generally the collar is 0.25 inches thick; however, there is an external ridge in the interior region of the collar. The thickness of the collar at the ridge is 0.50 inches. The overall diameter at the ridge is 1.8 inches. The external profile of the collar is similar to that shown in FIG. 4D.

In the foregoing, the present invention has been described with reference to suitable embodiments, but these embodiments are only for purposes of understanding the invention and various alterations or modifications are possible so long as the present invention does not deviate from the claims that follow.

What is claimed is:

1. A lateral displacement assist device for use in conjunction with a quick-release hose coupler that has a laterally displaceable annular locking sleeve, said device comprising a tube having an outer side with two ends and an interior grasping region there between, and an inner cavity with an inner surface of substantially constant diameter traversing the long axis of said tube, said device contoured to fit into the hand of a user such that the interior grasping region bulges away from the tube thereby substantially increasing the thickness between the inner surface and outer side in the interior region relative to the two ends, said device positionable on the locking sleeve with the inner surface affixable to the locking sleeve.

2. The device of claim 1 wherein the device is permanently affixed to the annular locking sleeve.

3. The device of claim 1 wherein the device is removably affixed to the annular locking sleeve.

4. The device of claim 3 composed of an elastic material that is radially stretchable such that the inner bore diameter is increased when the tube is radially stretched from a relaxed to a stretched position, said device being positionable around the annular locking sleeve when expanded to the stretched position, thereby gripably affixing to the sleeve after positioning.

5. A lateral displacement assist device for use in conjunction with a quick-release hose coupler attached to a free end of a hose and having an annular lateral displacement locking sleeve, said device comprising a tube having an outer side with two ends and an interior grasping region between them, and an inner cavity with an inner surface of substantially constant diameter traversing the long axis of said tube, wherein the outer side is contoured to fit into the hand of a user such that the interior grasping region bulges out from the tube axis thereby substantially increasing the thickness between the inner surface and outer side in the interior region relative to the two ends, the device positionable on the locking sleeve with the inner surface affixable to the locking sleeve, said device providing purchase for the thumb of said user's hand thereby enabling one-handed lateral displacement of the locking sleeve away from the coupling end of the hose.

6. The device of claim 5 wherein the device is permanently affixed to the annular locking sleeve.

7. The device of claim 5 wherein the device is removably affixed to the annular locking sleeve.

8. The device of claim 7 composed of an elastic material that is radially stretchable such that the inner bore diameter is increased when the tube is radially stretched from a relaxed to a stretched position, said device being positionable around the annular locking sleeve when expanded to the stretched position, thereby gripably affixing to the sleeve after positioning.

9. In combination, a quick-release hose coupler and a lateral displacement assist device, said hose coupler comprising an elongated body having a longitudinal axis, a central bore and an annular locking sleeve slidably affixed to the perimeter of the body; said device comprising a tube having an outer side two ends and an interior region between them, and an inner cavity with an inner surface of substantially constant diameter traversing the long axis of said tube, the outer side of said device being contoured to fit into the hand of a user such that the interior region bulges out from the tube axis thereby substantially increasing the thickness between the inner surface and outer side in the interior region relative to the two ends, the device positionable on the sleeve with the inner surface affixable to the sleeve.

10. The combination of claim 9 wherein the device is permanently affixed to the annular locking sleeve of the coupler body.

11. The combination of claim 9 wherein the device is removably affixed to the annular locking sleeve.

12. The combination of claim 11 wherein the device is composed of an elastic material that is radially stretchable such that the inner bore diameter is increased when the tube is radially stretched from a relaxed to a stretched position, said device being positionable around the annular locking sleeve when expanded to the stretched position, thereby gripably affixing to the sleeve after positioning.

13. The combination of claim 9 wherein the quick-release hose coupling is adapted for use with fluids.

14. The combination of claim 9 wherein the quick-release coupling is adapted for use with gasses.

* * * * *